(12) United States Patent
Zhang

(10) Patent No.: US 8,169,112 B2
(45) Date of Patent: May 1, 2012

(54) POSITION SENSING DEVICE AND MOTOR USING THE SAME

(75) Inventor: Xu Zhang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 372 days.

(21) Appl. No.: 12/638,970

(22) Filed: Dec. 15, 2009

(65) Prior Publication Data
US 2010/0225206 A1 Sep. 9, 2010

(30) Foreign Application Priority Data

Mar. 5, 2009 (CN) .......................... 2009 1 0037760

(51) Int. Cl.
*H02K 11/00* (2006.01)

(52) U.S. Cl. ..................................... 310/68 B

(58) Field of Classification Search ............... 310/68 B, 310/68 R, 71
See application file for complete search history.

(56) References Cited

U.S. PATENT DOCUMENTS

| | | | | | |
|---|---|---|---|---|---|
| 4,973,869 | A | * | 11/1990 | Cho | 310/68 B |
| 4,998,865 | A | * | 3/1991 | Nakanishi et al. | 417/423.7 |
| 5,194,771 | A | * | 3/1993 | Otsuki et al. | 310/68 B |
| 5,272,402 | A | * | 12/1993 | Blaser et al. | 310/68 B |
| 6,407,473 | B1 | * | 6/2002 | Horng et al. | 310/68 B |
| 6,462,443 | B2 | * | 10/2002 | Horng | 310/68 B |
| 7,999,425 | B2 | * | 8/2011 | Utsumi et al. | 310/68 D |
| 2002/0153787 | A1 | * | 10/2002 | Hollenbeck et al. | 310/68 R |

* cited by examiner

*Primary Examiner* — Tran Nguyen
(74) *Attorney, Agent, or Firm* — Matthias Scholl P.C.; Matthias Scholl

(57) ABSTRACT

A position sensing device for a motor, the motor has a stator having a coil winding, and a rotor, and the position sensing device including a fixing frame, including a first fixing portion, a second fixing portion, a third fixing portion, and a fourth fixing portion, multiple Hall components, and a PCB board. The position sensing device is connected to the stator via the first fixing portion whereby detecting a position of the rotor, the second fixing portion operates to fix a power lead connected to the coil winding of the stator, the PCB board is disposed on the fixing frame via the third fixing portion, and the Hall component is disposed on the fixing frame via the fourth fixing portion and connected to the PCB board. The invention features simple structure and is capable of being firmly connected and fixed to other electronic components such as a power lead, a PCB board and so on.

17 Claims, 5 Drawing Sheets

POSITION SENSING DEVICE AND MOTOR USING THE SAME

CROSS-REFERENCE TO RELATED APPLICATIONS

Pursuant to 35 U.S.C. §119 and the Paris Convention Treaty, this application claims the benefit of Chinese Patent Application No. 200910037760.9 filed on Mar. 5, 2009, the contents of which are incorporated herein by reference.

BACKGROUND OF THE INVENTION

1. Field of the Invention

The invention relates to a position sensing device and a motor using the same.

2. Description of the Related Art

Sensing devices such as are widely used in motors to detect positions of stators. However, there are several problems with conventional sensing devices: structure of the sensing devices is complex, and connection and fixation between the sensing devices and electric components such as power leads, PCB boards and so on are not firm enough.

SUMMARY OF THE INVENTION

In view of the above-described problem, it is one objective of the invention to provide a position sensing device for a motor that features simple structure and is capable of being firmly connected and fixed to other electronic components such as a power lead, a PCB board and so on.

It is another objective of the invention to provide a motor having a position sensing device that features simple structure and is capable of being firmly connected and fixed to other electronic components such as a power lead, a PCB board and so on.

To achieve the above objectives, in accordance with one embodiment of the invention, provided is a position sensing device for a motor, the motor comprising a stator having a coil winding, and a rotor, and the position sensing device comprising a fixing frame, comprising a first fixing portion, a second fixing portion, a third fixing portion, and a fourth fixing portion, multiple Hall components, and a PCB board. The position sensing device is connected to the stator via the first fixing portion whereby detecting a position of the rotor, the second fixing portion operates to fix a power lead connected to the coil winding of the stator, the PCB board is disposed on the fixing frame via the third fixing portion, and the Hall component is disposed on the fixing frame via the fourth fixing portion and connected to the PCB board.

In a class of this embodiment, an end insulating plate is disposed on one end of the stator.

In a class of this embodiment, the first fixing portion comprises multiple first hooks, buckling holes, notches and first buckles, and the first hook is received in the notch, and the first buckle is received in the buckling hole.

In a class of this embodiment, the first hook and the buckling hole are disposed on the end insulating plate.

In a class of this embodiment, the notch and the first buckle are disposed on the fixing frame.

In a class of this embodiment, the first fixing portion further comprises a positioning cylinder and a positioning hole fit with each other, the positioning cylinder is disposed on the end insulating plate, and the positioning hole is disposed on the fixing frame.

In a class of this embodiment, the second fixing portion comprises a wire inlet, multiple wire pressing portions, and multiple second hooks, the wire inlet is disposed on a front end of the fixing frame, and the wire pressing portion and the second hook are disposed at the bottom of the fixing frame.

In a class of this embodiment, the third fixing portion comprise a first groove and a pair of second buckles, the first groove is disposed on the fixing frame, the second buckles are disposed on a pair of side walls of the first groove, and the PCB board is received in the first groove and fixed by the second buckle.

In a class of this embodiment, a second groove is disposed on one side of the first groove, sealant is injected via the first groove and seals and fixes the PCB board, and redundant sealant in the first groove flows into the second groove.

In a class of this embodiment, the fourth fixing portion is a hollow flange.

In a class of this embodiment, the hollow flange is disposed at the bottom of the fixing frame below the PCB board, multiple connecting holes are disposed at the bottom of the hollow flange, a stop plate is formed between adjacent connecting holes, the Hall component is disposed in the hollow flange, and pins of the Hall component are connected to the PCB board via the connecting holes.

In a class of this embodiment, the stop plate is in the shape of 'n', 'm' or '='.

In a class of this embodiment, the number of the Hall components is at least more than 2.

In a class of this embodiment, the Hall components are distributed on sensor nodes each having an electrical angle of 90 degree, 120 degree or 270 degree.

In a class of this embodiment, the Hall components are Hall integrated circuits (IC).

In a class of this embodiment, multiple connecting terminals are disposed on a tail end of the fixing frame and connected to the PCB board.

In accordance with another embodiment of the invention, provided is a motor, comprising a stator having a coil winding, a rotor, and a position sensing device, comprising a fixing frame, comprising a first fixing portion, a second fixing portion, a third fixing portion, and a fourth fixing portion, multiple Hall components, and a PCB board. The position sensing device is disposed on the stator via the first fixing portion whereby detecting a position of the rotor, the second fixing portion operates to fix a power lead connected to the coil winding of the stator, the PCB board is disposed on the fixing frame via the third fixing portion, and the Hall component is disposed on the fixing frame via the fourth fixing portion and electrically connected to the PCB board.

Advantage of the invention comprise: 1) the first fixing portion firmly fixes the power lead and protects the power lead from being broken or loosening; 2) the first hook, the notch, the first buckle, and the buckling hole facilitate convenient assembly, accurate positioning, improved operation quality and efficiency; 3) the positioning cylinder and the positioning hole make the position sensing device more accurate and reliable; 4) the wire inlet, the wire pressing portion, and the second hook firmly fix the power lead and feature small size and good practicality; 5) installation of the PCB board is convenient; 6) the first groove and the second groove firmly firm the PCB board via the sealant, and improve sealing technology and quality; 7) the hollow flange and the connecting holes facilitate accurate position and convenient installation of the Hall components; 8) the Hall components feature good universality and controllability; 9) the connecting terminals make it convenient to connect the PCB board to other electric components.

BRIEF DESCRIPTION OF THE DRAWINGS

The invention is described hereinafter with reference to accompanying drawings, in which.

DETAILED DESCRIPTION OF THE EMBODIMENTS

Figure 1:
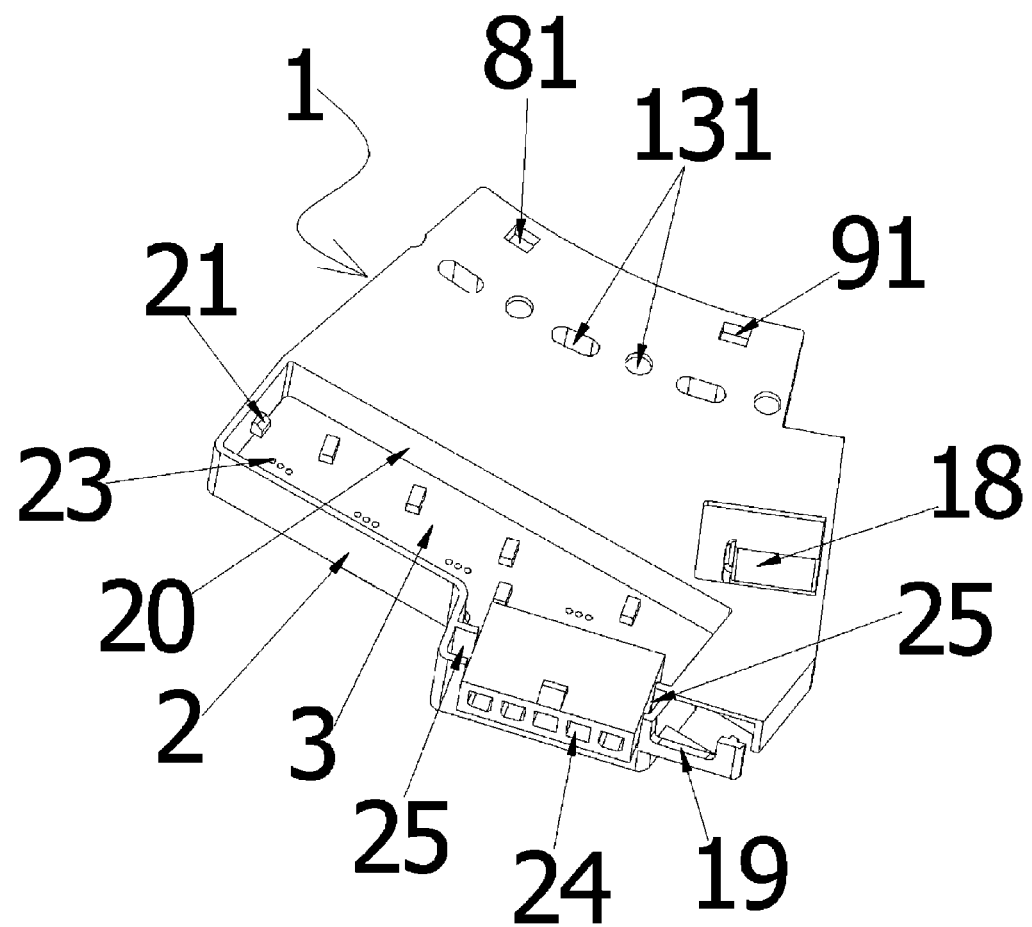
FIG. 1 is a schematic view of a position sensing device of an embodiment of the invention.
Figure 2:
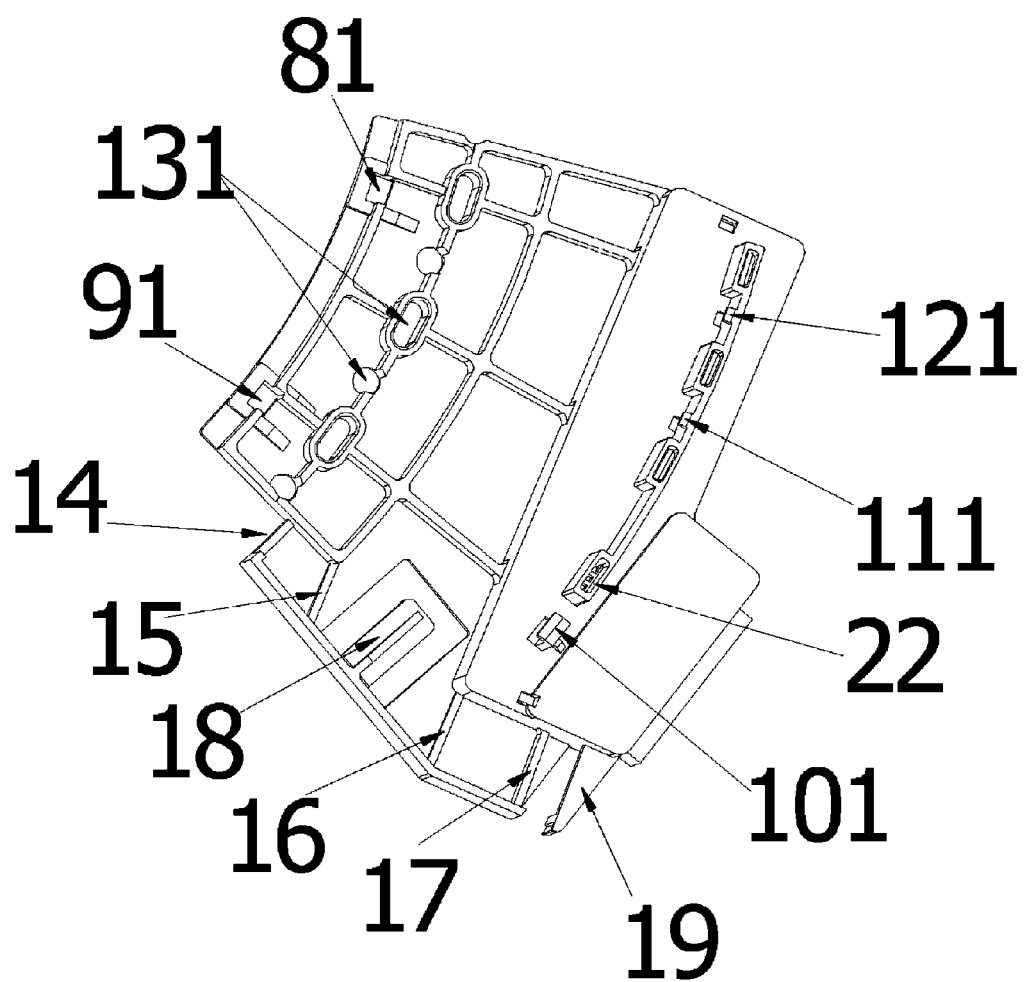
FIG. 2 is another schematic view of a position sensing device of an embodiment of the invention.
Figure 3:
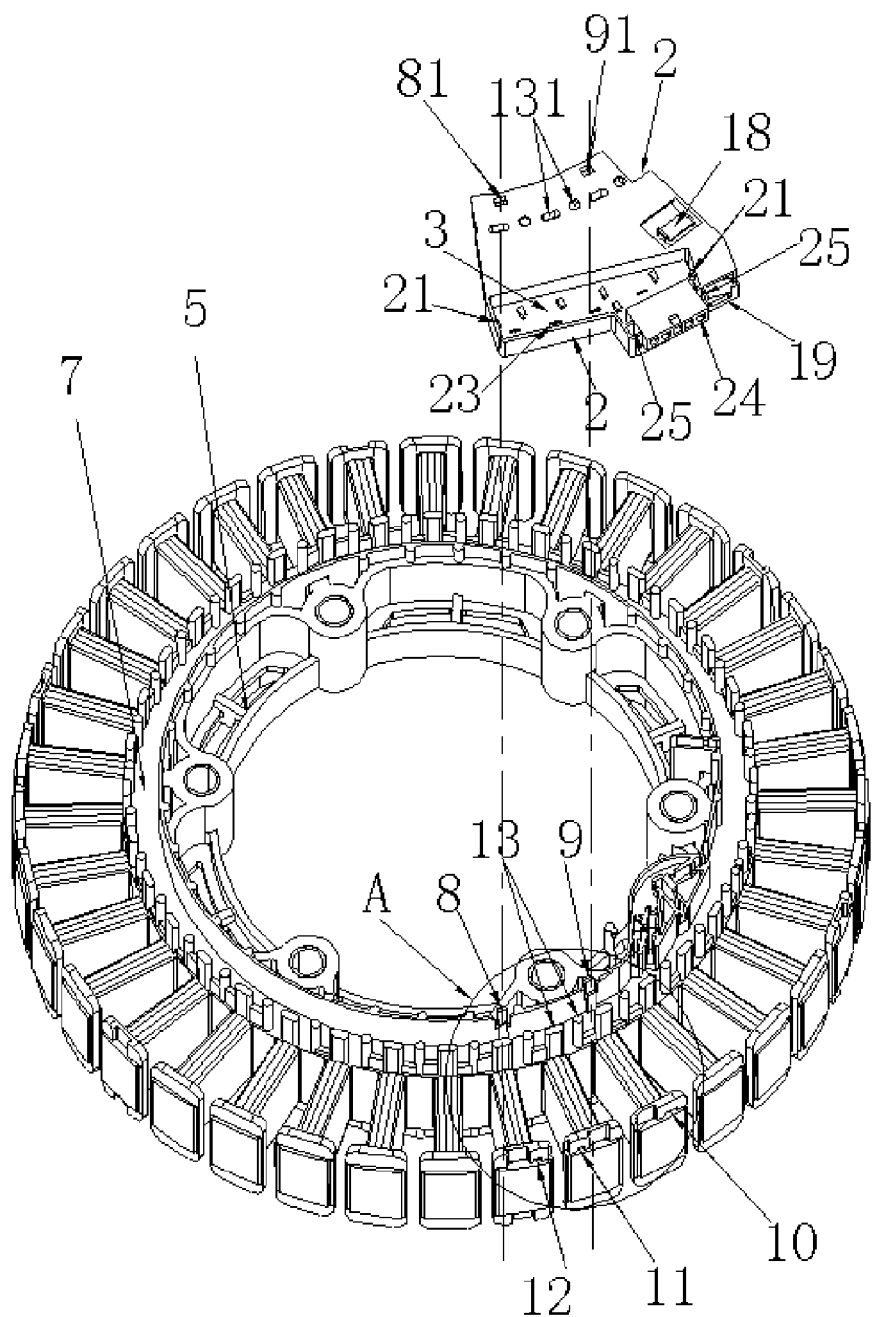
FIG. 3 is an assembly view of a position sensing device and a stator.
Figure 4:
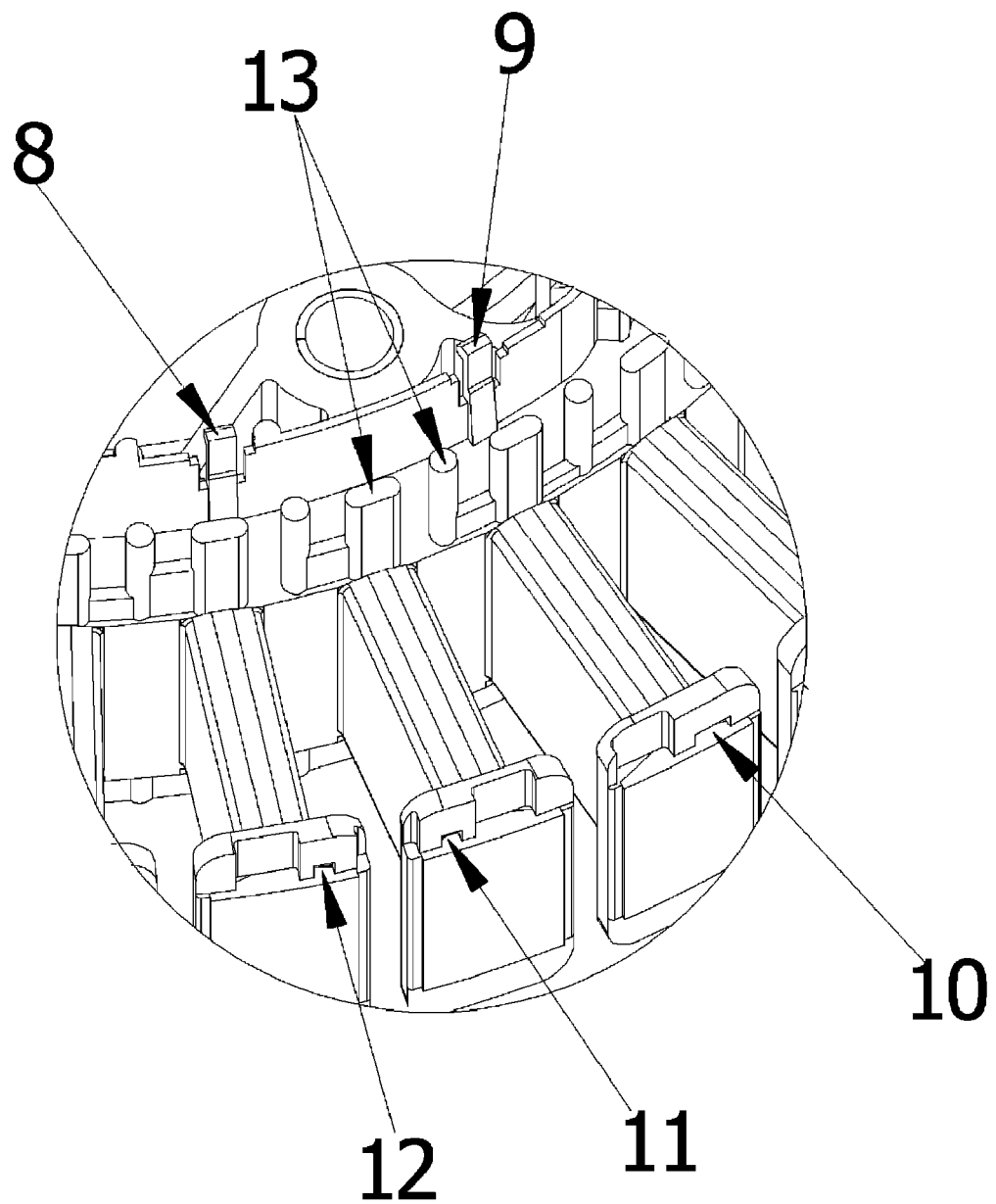
FIG. 4 is an enlarged view of an A portion of FIG. 3.
Figure 5:
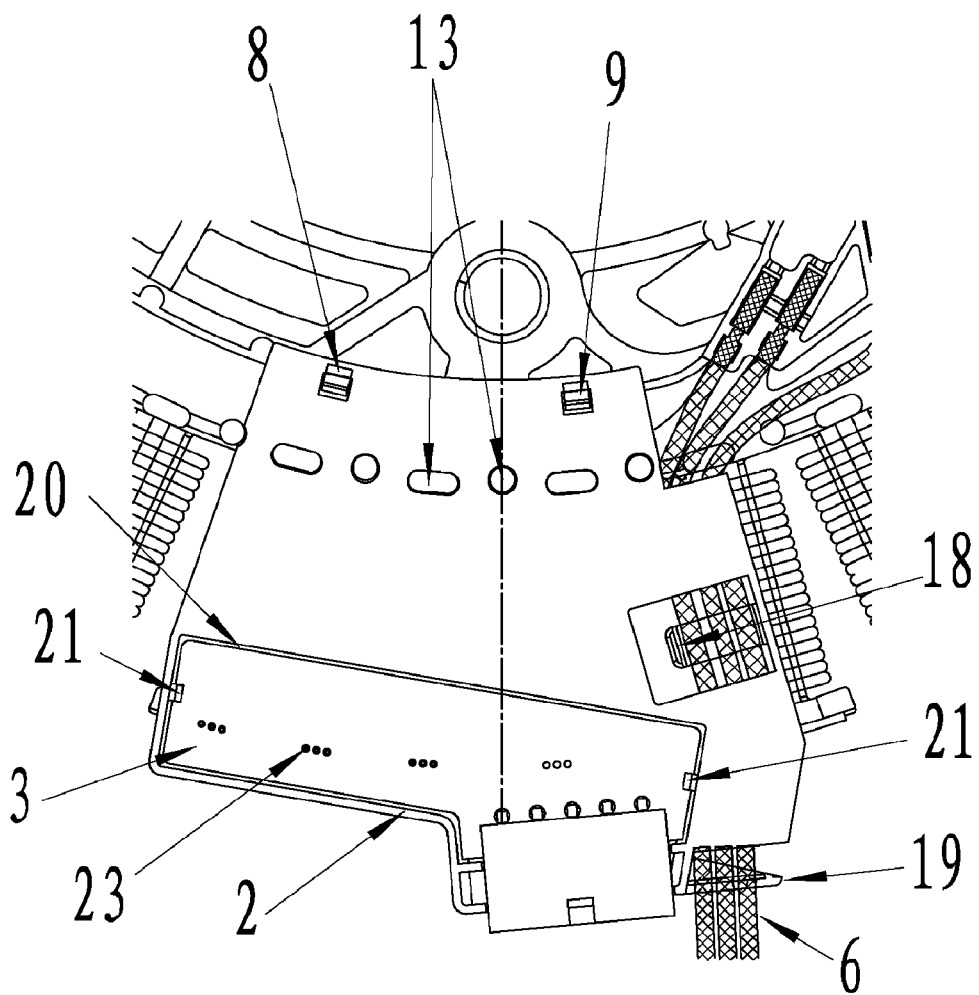
FIG. 5 is a partial schematic view of a position sensing device disposed on a stator.

As shown in FIGS. 1-4, a position sensing device 1 of the invention comprises a fixing frame 2, multiple Hall components, and a PCB board 3.

The fixing frame 2 comprises a first fixing portion, a second fixing portion, a third fixing portion, and a fourth fixing portion.

The position sensing device 1 is connected to a stator 5 via the first fixing portion whereby detecting a position of a rotor.

The second fixing portion operates to fix a power lead 6 connected to a coil winding of the stator 5.

The PCB board 3 is disposed on the fixing frame 2 via the third fixing portion.

The Hall component is disposed on the fixing frame 2 via the fourth fixing portion and connected to the PCB board 3.

An end insulating plate 7 is disposed on one end of the stator.

The first fixing portion comprises multiple first hooks 8 and 9, multiple buckling holes 10, 11, and 12, multiple notches 81 and 91, multiple first buckles 101, 111, and 121, a positioning cylinder 13, and a positioning hole 131. The first hooks 8 and 9 and the buckling holes 10, 11, and 12 are disposed on the end insulating plate 7, and the notches 81 and 91 and the first buckles 101, 111, and 121 are disposed on the fixing frame 2.

The first hook 8 is received in the notch 81, and the first hook 9 is received in the notch 91.

The first buckle 101 is received in the buckling hole 10, the first buckle 111 is received in the buckling hole 11, and the first buckle 121 is received in the buckling hole 12.

The positioning cylinder 13 is disposed on the end insulating plate 7, the positioning hole 131 is disposed on the fixing frame 2, and the positioning cylinder 13 and the positioning hole 131 are fit with other.

The second fixing portion comprises a wire inlet 14, multiple wire pressing portions 15, 16 and 17, and multiple second hooks 18 and 19. The wire inlet 14 is disposed on a front end of the fixing frame 2, and the wire pressing portions 15, 16 and 17 and the second hooks 18 and 19 are disposed at the bottom of the fixing frame 2.

The third fixing portion comprises a first groove 20 and a pair of second buckles 21. The first groove 20 is disposed on the fixing frame 2, and the second buckles 21 are disposed on a pair of side walls of the first groove 20.

The PCB board 3 is received in the first groove 20 and fixed by the second buckle 21.

A second groove 25 is disposed on one side of the first groove 20. Sealant is injected via the first groove 20 and seals and fixes the PCB board 3, and redundant sealant in the first groove 20 flows into the second groove 25.

The fourth fixing portion is a hollow flange 22. The hollow flange 22 is disposed at the bottom of the fixing frame 2 below the PCB board 3. Multiple connecting holes 23 are disposed at the bottom of the hollow flange 22. A stop plate is formed between adjacent connecting holes 23, and is in the shape of 'n', 'm' or '='.

The Hall component is disposed in the hollow flange 22, and pins of the Hall component are connected to the PCB board 3 via the connecting holes 23.

The number of the Hall components is at least more than 2, and the Hall components are distributed on sensor nodes each having an electrical angle of 90 degree, 120 degree or 270 degree. In this embodiment, the Hall component is a Hall integrated circuit (IC).

Multiple connecting terminals 24 are disposed on a tail end of the fixing frame 2 and electrically connected to the PCB board 3.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A position sensing device for a motor, the motor comprising a stator having a coil winding, and a rotor, and the position sensing device comprising:
   a fixing frame, comprising
      a first fixing portion;
      a second fixing portion;
      a third fixing portion; and
      a fourth fixing portion;
   multiple Hall components; and
   a PCB board;
   wherein
      the position sensing device is disposed on the stator via said first fixing portion for detecting a position of the rotor;
      said second fixing portion operates to fix a power lead connected to the coil winding of the stator;
      said PCB board is disposed on said fixing frame via said third fixing portion; and
      said Hall component is disposed on said fixing frame via said fourth fixing portion and connected to said PCB board.

2. The position sensing device of claim 1, wherein an end insulating plate is disposed on one end of the stator.

3. The position sensing device of claim 2, wherein
   said first fixing portion comprises multiple first hooks, buckling holes, notches and first buckles;
   said first hook is received in said notch; and
   said first buckle is received in said buckling hole.

4. The position sensing device of claim 3, wherein said first hook and said buckling hole are disposed on said end insulating plate.

5. The position sensing device of claim 3, wherein said notch and said first buckle are disposed on said fixing frame.

6. The position sensing device of claim 2, wherein
   said first fixing portion further comprises a positioning cylinder and a positioning hole fit with each other;
   said positioning cylinder is disposed on said end insulating plate; and
   said positioning hole is disposed on said fixing frame.

7. The position sensing device of claim 1, wherein
   said second fixing portion comprises a wire inlet, multiple wire pressing portions, and multiple second hooks;
   said wire inlet is disposed on a front end of said fixing frame; and said wire pressing portion and said second hook are disposed at the bottom of said fixing frame.

8. The position sensing device of claim 1, wherein
said third fixing portion comprise a first groove and a pair of second buckles;
said first groove is disposed on said fixing frame;
said second buckles are disposed on a pair of side walls of said first groove; and
said PCB board is received in said first groove and fixed by said second buckle.

9. The position sensing device of claim 8, wherein
a second groove is disposed on one side of said first groove;
sealant is injected via said first groove and seals and fixes said PCB board; and
redundant sealant in said first groove flows into said second groove.

10. The position sensing device of claim 1, wherein said fourth fixing portion is a hollow flange.

11. The position sensing device of claim 10, wherein
said hollow flange is disposed at the bottom of said fixing frame below said PCB board;
multiple connecting holes are disposed at the bottom of said hollow flange;
a stop plate is formed between adjacent connecting holes;
said Hall component is disposed in said hollow flange; and
pins of said Hall component are connected to said PCB board via said connecting holes.

12. The position sensing device of claim 11, wherein said stop plate is in the shape of 'n', 'm' or '='.

13. The position sensing device of claim 1, wherein the number of said Hall components is at least more than 2.

14. The position sensing device of claim 1, wherein said Hall components are distributed on sensor nodes each having an electrical angle of 90 degree, 120 degree or 270 degree.

15. The position sensing device of claim 1, wherein said Hall components are Hall integrated circuits (IC).

16. The position sensing device of claim 1, wherein multiple connecting terminals are disposed on a tail end of said fixing frame and electrically connected to said PCB board.

17. A motor, comprising
a stator having a coil winding;
a rotor; and
a position sensing device, comprising
a fixing frame, comprising
a first fixing portion;
a second fixing portion;
a third fixing portion; and
a fourth fixing portion;
multiple Hall components; and
a PCB board;
wherein
said position sensing device is disposed on said stator via said first fixing portion for detecting a position of said rotor;
said second fixing portion operates to fix a power lead connected to said coil winding of the stator;
said PCB board is disposed on said fixing frame via said third fixing portion; and
said Hall component is disposed on said fixing frame via said fourth fixing portion and connected to said PCB board.

* * * * *